US010836222B2

(12) United States Patent
Stewart et al.

(10) Patent No.: US 10,836,222 B2
(45) Date of Patent: Nov. 17, 2020

(54) TIRE MOUNTED SENSORS WITH CONTROLLED ORIENTATION AND REMOVAL DETECTION

(71) Applicant: Sensata Technologies, Inc., Attleboro, MA (US)

(72) Inventors: William D. Stewart, Antrim (IE); Samuel K. Strahan, Broughshane (IE); Dominic Douglas, Ballycastle (IE)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 64 days.

(21) Appl. No.: 16/172,017

(22) Filed: Oct. 26, 2018

(65) Prior Publication Data

US 2020/0130433 A1 Apr. 30, 2020

(51) Int. Cl.
*B60C 23/04* (2006.01)
*H01Q 1/22* (2006.01)

(52) U.S. Cl.
CPC ...... *B60C 23/0491* (2013.01); *B60C 23/0452* (2013.01); *H01Q 1/2241* (2013.01)

(58) Field of Classification Search
None
See application file for complete search history.

(56) References Cited

U.S. PATENT DOCUMENTS

| 6,546,982 B1 * | 4/2003 | Brown | B60C 23/04 152/152.1 |
| 7,331,367 B2 * | 2/2008 | Koch | B60C 23/0493 152/152.1 |
| 7,881,066 B2 * | 2/2011 | Scheungraber | G06K 19/07764 361/760 |
| 9,070,069 B2 * | 6/2015 | Sinnett | G06K 19/07764 |
| 9,566,835 B2 * | 2/2017 | Yamaguchi | B60C 23/0493 |
| 10,668,779 B2 * | 6/2020 | Nagaya | F16M 13/02 |

(Continued)

FOREIGN PATENT DOCUMENTS

| CN | 107433827 | 12/2017 |
| DE | 102012216576.2 | 5/2014 |

(Continued)

OTHER PUBLICATIONS

Search Report for GB Patent Application No. 1901899.3, relating to claims 10-15, dated Jan. 20, 2020, 3 pages.

(Continued)

*Primary Examiner* — Natalie Huls
*Assistant Examiner* — Jermaine L Jenkins
(74) *Attorney, Agent, or Firm* — Mark H. Williams (57) ABSTRACT

Tire mounted sensors have controlled orientation with respect to a direction of vehicle travel when fitted to a tire of the vehicle. The tire mounted sensor includes a sensor housing containing a pressure and/or other type of sensor and electronic components which is inserted into a sensor mount attached to the tire. Controlling the orientation of the orientation-sensitive components relative to the direction of travel of the vehicle is achieved by indicating the direction of travel of the vehicle on the sensor mount. Controlling the orientation of the sensor housing within the sensor mount, preferably in all six axes of freedom, is achieved by an orientation key or asymmetrical feature on the sensor mount that corresponds to a mating feature on the sensor housing.

15 Claims, 11 Drawing Sheets

(56) References Cited

U.S. PATENT DOCUMENTS

| | | | |
|---|---|---|---|
| 10,688,837 B2* | 6/2020 | Mori | B60C 23/0493 |
| 2004/0261510 A1 | 12/2004 | Schulze | |
| 2005/0132792 A1 | 6/2005 | Lemense et al. | |
| 2007/0175554 A1* | 8/2007 | Bertrand | B60C 23/0493 |
| | | | 152/152.1 |
| 2007/0257666 A1 | 11/2007 | Laure et al. | |
| 2009/0173422 A1* | 7/2009 | Utsumi | B60C 23/0493 |
| | | | 152/510 |
| 2010/0276563 A1* | 11/2010 | Cubizolle | B60C 23/0493 |
| | | | 248/633 |
| 2014/0352420 A1 | 12/2014 | Brusarosco et al. | |
| 2017/0166016 A1* | 6/2017 | Sakamoto | B60C 23/0493 |
| 2017/0174014 A1* | 6/2017 | Stewart | B60C 23/0493 |
| 2017/0284786 A1 | 10/2017 | Dudar et al. | |
| 2020/0114704 A1* | 4/2020 | Nakatani | B60C 11/00 |

FOREIGN PATENT DOCUMENTS

| | | |
|---|---|---|
| EP | 2777958 | 9/2014 |
| WO | 2017/150396 | 9/2017 |

OTHER PUBLICATIONS

Search Report for GB Patent Application No. 1901899.3, dated Jul. 12, 2019, 8 pages.

* cited by examiner

TIRE MOUNTED SENSORS WITH CONTROLLED ORIENTATION AND REMOVAL DETECTION

FIELD

The disclosure relates generally to tire mounted sensors for use in a tire pressure monitoring system and, more particularly, to tire mounted sensors that are keyed to control mounting orientation and/or have removal detection.

BACKGROUND

Vehicle safety is a primary concern for drivers while travelling, with air pressure level in the tires being one of several important factors. While a vehicle can move safely with a normal tire pressure, excessive or insufficient tire pressure makes for uneven tire wear, poor performance and may even result in a punctured or flat tire. Prior to advances in automotive technology and electronics, conventional methods for measuring tire pressure could only be performed on a stationary vehicle. As such, a driver would not be able to immediately recognize changes in tire pressure while driving, and take appropriate actions to restore vehicle safety.

To better and more conveniently measure tire pressure in real time, various tire pressure monitoring systems have since been developed. Tire-pressure monitoring systems (TPMS) are typically electronic systems which include an air pressure sensor and electronic components which can be mounted directly to a pneumatic tire on various types of vehicles. TPMS can also include other types of sensors, such as sensors for measuring temperature and accelerometric forces. TPMS can report real-time tire pressure and other information to the driver of the vehicle, typically via a gauge, a pictogram display, or a simple warning light. However, the ability to utilize features of the TPMS that rely on specific accelerometric and directional data of the tire depends upon controlling the orientation of the air pressure or other type of sensor relative to the direction of travel of the vehicle.

An additional feature of TPMS is that the tires and their respective sensors are a matched pair. That is, the sensors may be programmed with data related to the specific tire. Therefore, if a sensor is removed and attached to a different tire, reprogramming may be required. Otherwise, incorrect data related to the tire may be reported to and used by the vehicle. In some instances, this incorrect data could be a safety concern.

SUMMARY

Described herein is a tire mounted sensor which has a controlled orientation with respect to a direction of vehicle travel when fitted to a tire of the vehicle. The tire mounted sensor includes a sensor housing containing an air pressure and/or other type of sensor and electronic components which is inserted into a sensor mount attached to the tire. Controlling the orientation of the orientation-sensitive components relative to the direction of travel of the vehicle is achieved by indicating the direction of travel on the sensor mount and controlling the orientation of the sensor housing within the sensor mount in all six axes of freedom (e.g., X, Y, Z and rotation about each). This is achieved by an orientation key or asymmetrical feature on the sensor mount that corresponds to a mating feature on the sensor housing. The sensor mount can include an external circuit located on or embedded into the sensor mount to relay information or to be interrogated by the sensor component to be used in features that require tire telemetry. Furthermore, the sensor housing and the sensor mount may advantageously include elements which detect when a programmed sensor housing has been removed from the sensor mount so that the need for reprogramming can be signaled to the vehicle or otherwise brought to light for proper attention.

Further examples of the tire mounted sensor of this disclosure may include one or more of the following, in any suitable combination.

In examples, the tire mounted sensor of this disclosure includes a mounting base with a top surface and a bottom surface. The bottom surface is configured to be mounted to a tire of a vehicle. The top surface includes an orientation key defining an asymmetrical opening in the top surface. The sensor also includes a housing for holding parameter sensing components. The housing is removeably insertable into the asymmetrical opening of the mounting base. The housing includes a boss corresponding to a shape of the asymmetrical opening of the mounting base such that, when the housing is inserted into the mounting base, the housing is fixed in a preselected position.

In further examples, the mounting base includes a first radio-frequency identification (RFID) component that interacts with a second RFID component in the housing. In examples, the first RFID component of the mounting base is in a vertical protrusion defined by a sidewall of the mounting base. In other examples, the first RFID component of the mounting base is in a horizontal protrusion located on the orientation key of the mounting base. The first and second RFID components are aligned on center when the housing is inserted into the mounting base. In examples, the orientation key includes at least one slit to allow flexing of the orientation key to facilitate insertion of the housing. The preselected position may be selected from all six axes of freedom or as many axes as are needed.

In other examples, a tire mounted sensor of this disclosure includes a mounting base and a sensor housing including a resonant circuit having a Q factor that varies based upon proximity to a detectable element of the mounting base. The sensor housing is removably insertable into the mounting base. The resonant circuit is configured to periodically measure the Q factor to determine whether the sensor housing is inserted into the mounting base. In examples, the housing has a complimentary shape for selective insertion into an asymmetrical opening of the mounting base such that, when the housing is inserted into the mounting base, the housing is fixed in a preselected position relative to the mounting base. In other examples, the detectable element is selected from the group consisting of a metallic ring, a metal spring, a magnet, a resonant circuit and a radioactive element.

In yet further examples, a method for detection of removal of a sensor housing from a sensor mount of a tire mounted sensor of this disclosure includes, during a stationary period with a sensor housing inserted in a sensor mount of a tire mounted sensor, applying a signal frequency to a resonant circuit in the sensor housing and measuring a baseline average peak value detected on the resonant circuit. A signal frequency is then periodically applied to the resonant circuit and a test average peak value detected on the resonant circuit is measured. The test average peak value and the baseline average peak value are then compared to determine whether the test average peak value deviates more than a preselected amount from the baseline average peak value. If the test average peak value deviates more than a preselected value from the baseline average peak value, a corrective action is performed. In examples, the corrective action is selected from the group consisting of: erasing a Tire ID stored for the respective sensor housing generate a fault; indicating, during periodic RF transmissions, that the Tire ID is invalid; and combinations thereof. In examples, the sensor mount includes a metallic element for enhancing a response of the resonant circuit to the signal. In further examples, the metallic element is an RFID chip. In yet further examples, the resonant circuit includes an ASIC for applying the signal and an inductor with a variable Q factor for providing a test point to acquire the baseline and test average peak values.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The disclosure will be more fully understood by reference to the detailed description, in conjunction with the following figures, wherein.

DETAILED DESCRIPTION

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the invention, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. "Front", "rear", "left side", "right side", "plan", "bottom" and the like are used solely with reference to the figures for illustration and are not meant in a limiting sense.

Figure 1A:
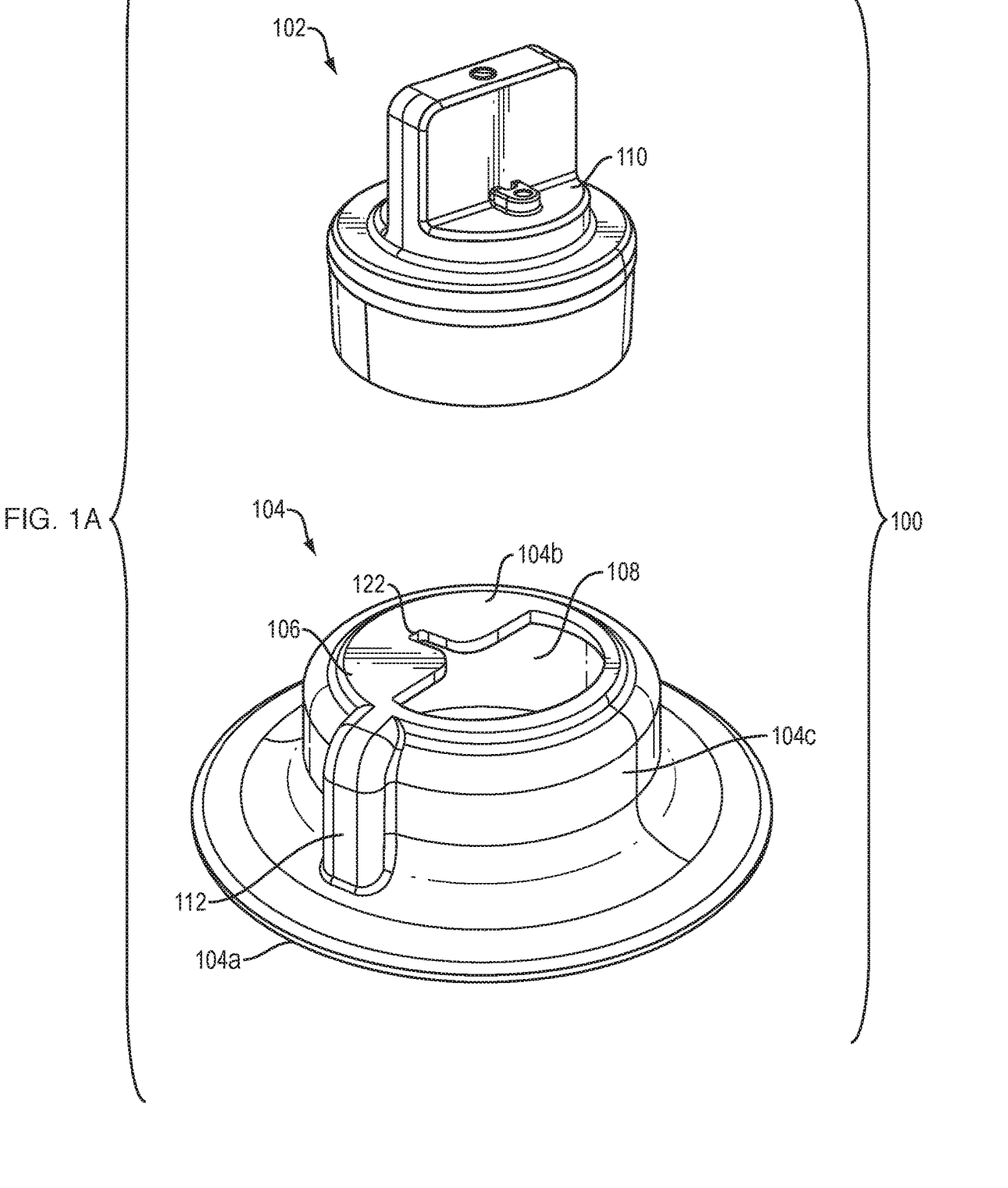
FIGS. 1A-C illustrate an example of the tire mounted sensor of this disclosure in an exploded front perspective view (FIG. 1A), an assembled front perspective view (FIG. 1B), and an assembled rear perspective view (FIG. 1C)
Figure 1B:
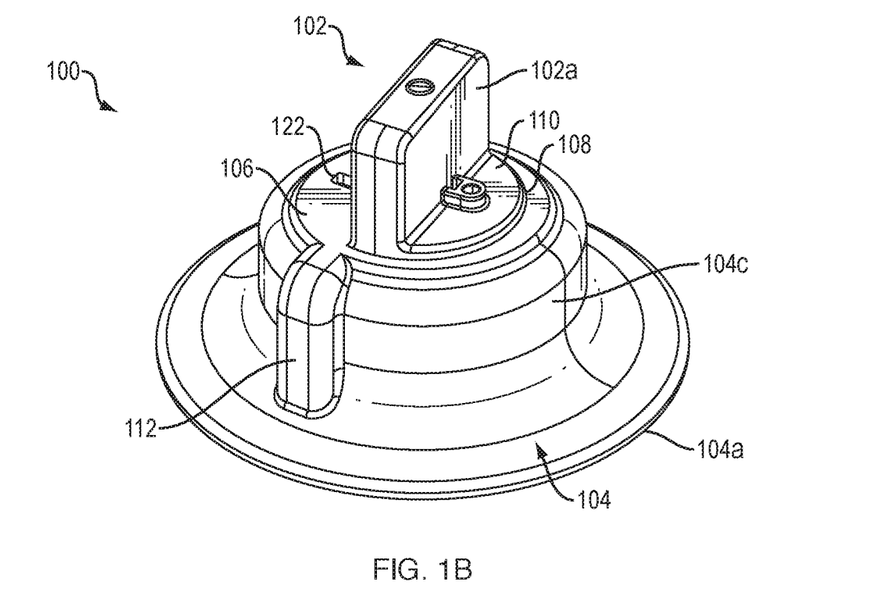
Figure 1C:
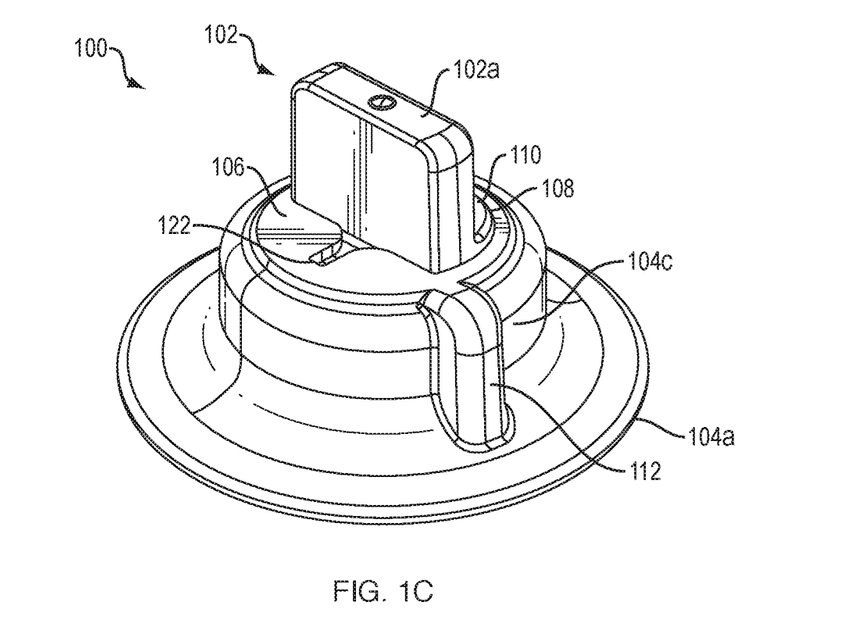

Referring now to FIGS. 1A-C, an example of a tire mounted sensor 100 of this disclosure for use in a TPMS is shown in an exploded view (FIG. 1A) and in assembled views (FIGS. 1B and 1C). As shown in FIG. 1A, the sensor 100 generally includes a sensor housing 102, in which one or more sensor components are provided, and a sensor mount 104. A bottom surface 104a of the sensor mount 104 can be mounted, for example, directly onto a tire of a vehicle (not shown). A top surface 104b of the sensor mount 104 defines an orientation key 106 to control the positioning of the sensor housing 102 with respect to the sensor mount 104. Advantageously, when secured in the sensor mount 104, not only the depth and placement but the rotational position of the sensor housing 102 are set in a desired predetermined position within the sensor mount 104. As a result, the sensor housing 102 is positioned to ensure proper operation within the TPMS, as further described below.

In examples, the orientation key 106 defines an asymmetrical opening 108 in the top surface 104b of the sensor mount 104. The shape of the asymmetrical opening 108 corresponds to a shape of the sensor housing 102, as further described below. As shown in FIGS. 1B and 1C, the sensor housing 102 includes a middle boss 110 laterally projecting from an upper boss 102a. When inserted into the asymmetrical opening 108, the middle boss 110 and the upper boss 102a substantially fill the opening 108. Because of the corresponding shapes of the asymmetrical opening 108 with the middle boss 110 and the upper boss 102a of the sensor housing 102, the sensor housing 102 can only be fitted to the sensor mount 104 when the sensor housing 102 and the sensor mount 104 are in the appropriate alignment. As the fit is a snug to tight interference fit, the sensor housing 102 is thus fixed in all six degrees of movement with respect to the sensor mount 104.

The sensor mount 104 may be made of a somewhat flexible material, such as rubber, for easy assembly. The sensor mount 104 can include one or more slits 122 to allow flexing of the orientation key 106 to facilitate insertion or removal of the sensor housing 102. In examples, the bottom surface 104a of the sensor mount 104 may have a circular shape with diameter of about 44 mm. A total height $H^1$ (FIG. 4C) of the sensor mount 104 may be about 14 mm. A sidewall 104c of the sensor mount 104 can define a vertical rib or protrusion 112 for accommodating a radio-frequency identification (RFID) chip (not explicitly shown), as further described below. The RFID chip may be inserted and attached (for example, glued) into the protrusion 112 from beneath the bottom surface 104a. The RFID chip may also be overmolded, snap fit, friction fit or otherwise applied to the protrusion 112 to secure the RFID chip in place. In examples, not shown, an outer surface of the sensor mount 104 can include indicia such as symbols or text (such as "Front", "Forward" or an arrow symbol) for controlling the orientation of the sensor mount 104 relative to the direction of travel of the vehicle.

Figure 2A:
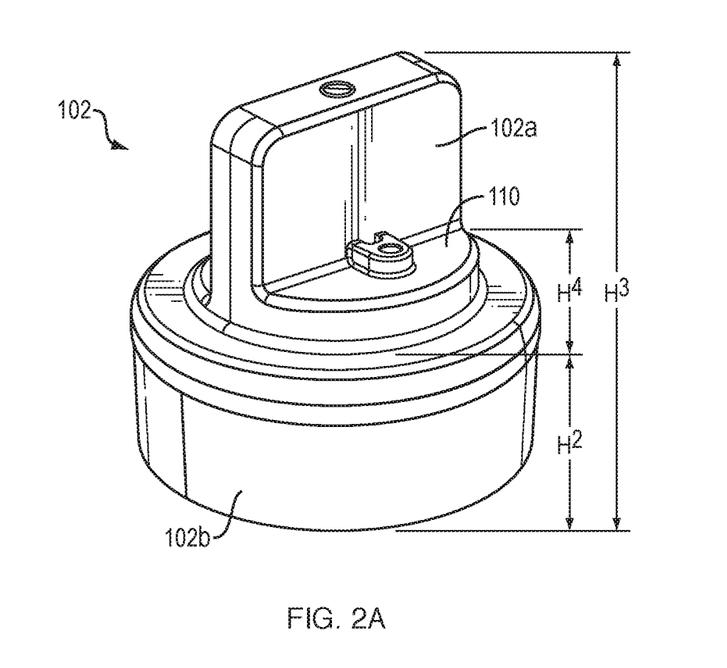
FIGS. 2A and 2B show detailed views of the sensor housing of FIGS. 1A-C.
Figure 2B:
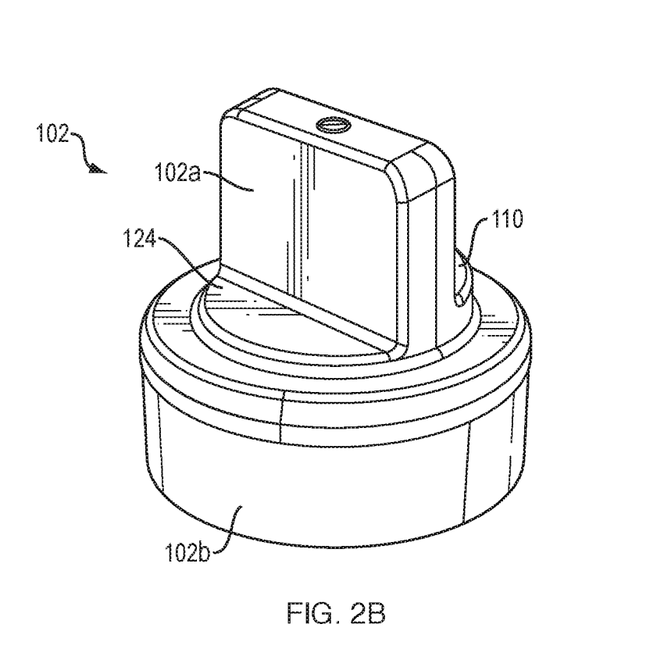

The sensor housing 102 is shown in more detail in FIGS. 2A and 2B. The sensor housing 102 may comprise the upper boss 102a and a base portion 102b. In examples, a lower boss 124 (FIG. 2B) opposes the middle boss 110. The lower boss 124 is relatively lower than the middle boss 110 to fit snugly under the top surface 104b of the sensor mount 104. A rear surface 103 of the upper boss 102a facing away from the middle boss 110 is shaped to abut the orientation key 106. In examples, the base portion 102b may be made of metal (such as aluminum or stainless steel), plastic, or ceramics. In other examples, the base portion 102b may have a circular shape with a diameter of about 24.6 mm. The upper boss 102a may be a single piece or have a multi-piece construction. The upper boss 102a may be made of a plastic or other material sufficient to withstand the conditions within a tire to protect the internal components of the housing 102 from being damaged. A height $H^2$ of the base portion 102b may be about 11 mm, while a total height $H^3$ of the sensor housing 102 may be about 24.5 mm. A height $H^4$ of the middle boss 110 plus the height $H^2$ of base portion 102 is substantially the same as the height $H^1$ of the sensor mount 104, or about 14 mm. Thus, control of the orientation of the sensor housing 102 within the sensor mount 104 in all six degrees of movement is achieved when the sensor housing 102 is fitted to the sensor mount 104 in the desired alignment.

Figure 3:
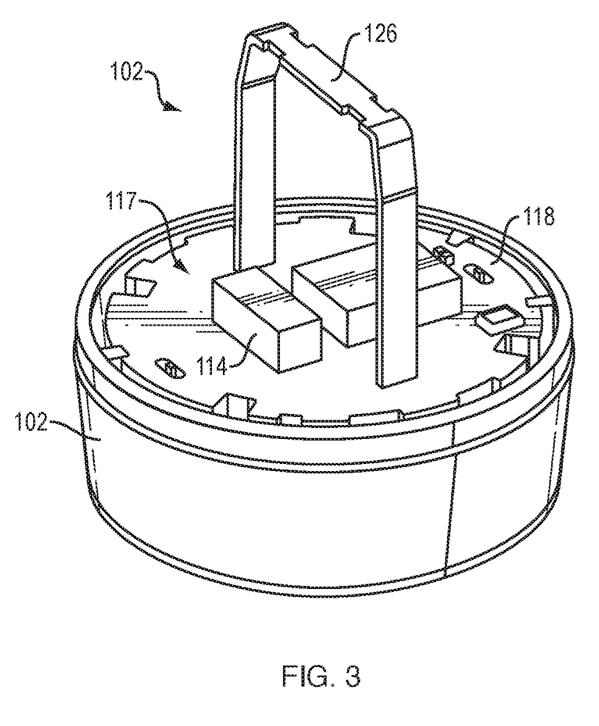
FIG. 3 illustrates an example arrangement of the component parts of the sensor housing of FIGS. 1A-C.

A non-limiting example of an arrangement of the internal components 117 of the sensor housing 102 of this disclosure is shown in FIG. 3. The internal components 117 of the sensor housing 102 may include a RF antenna 126, a transponder coil 114, and a printed circuit board (PCB) 118, among other components, such as one or more batteries 113 (FIG. 4C). The PCB 118 may include an air pressure and/or other type of sensor, an accelerometer, RFID elements such as a chip and/or reader, one or more ASIC packages 152, shielding, battery tag slot locations and other components. The RFID chip(s) and reader may be active or passive. The internal components 117 are sized and packaged to fit into the sensor housing 102 and are oriented on the PCB 118 as needed for proper operation of the tire mounted sensor 100, as described below.

Figure 4A:
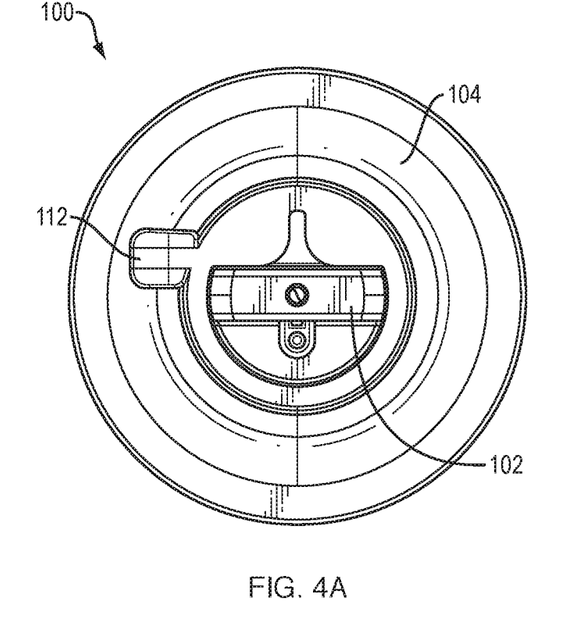
FIGS. 4A and 4B are plan and plan sectional views, respectively, of the sensor housing of FIGS. 1A-C inserted into the sensor mount.
Figure 4B:
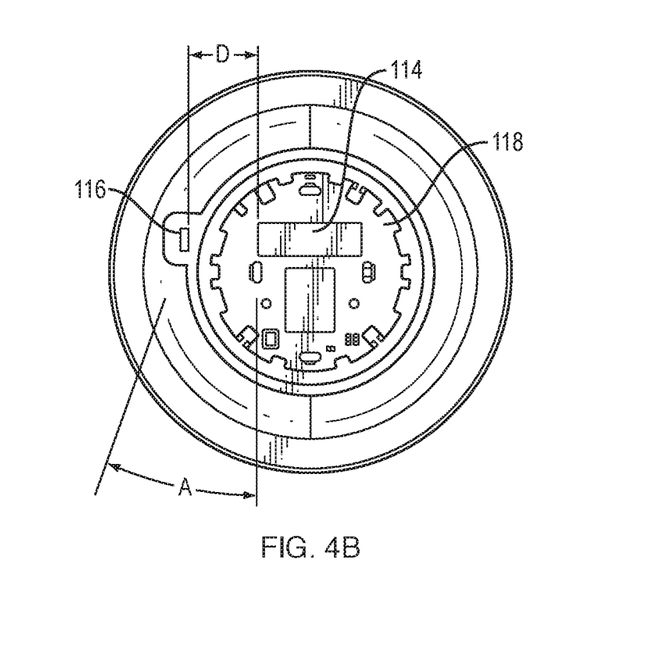
Figure 4C:
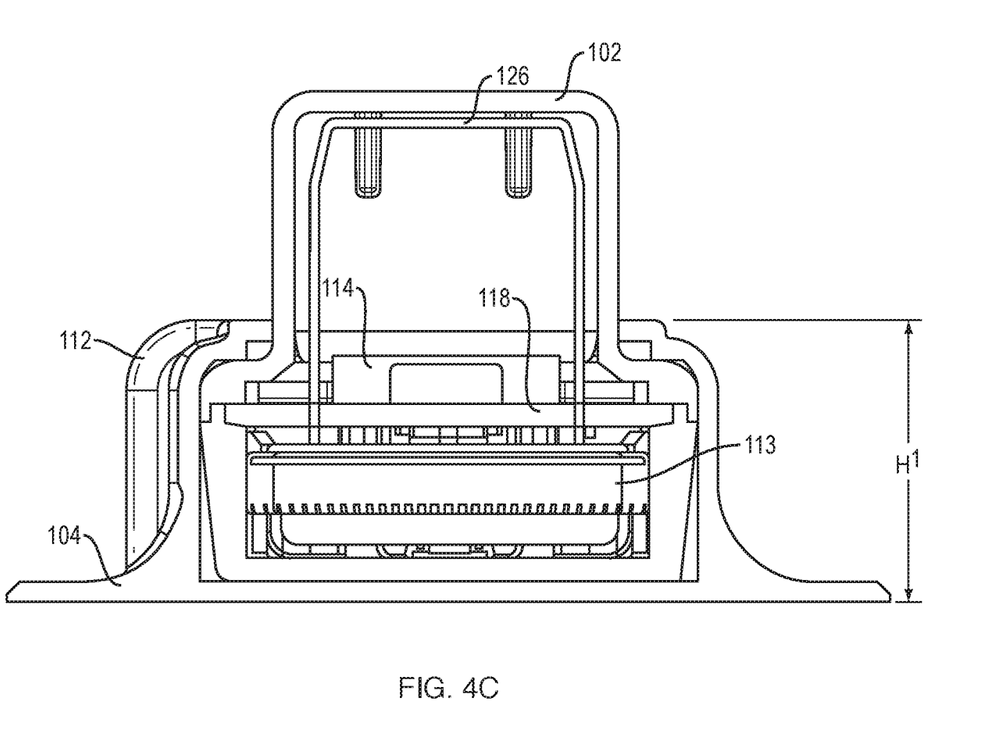
FIG. 4C is a cross-sectional view of the sensor housing of FIGS. 1A-C inserted into the sensor mount.

FIGS. 4A and 4B are plan and plan sectional views, respectively, of the sensor housing 102 inserted into the sensor mount 104. The vertical protrusion 112 of the sensor mount 104 contains a RFID tag or chip 116 (FIG. 4B) and the PCB 118 includes a corresponding RFID reader or transponder coil 114. In examples, not shown, the arrangement of the RFID chip 116 and transponder coil 114 may be reversed to match a desired system design. As shown in FIG. 4B, a distance D between the transponder coil 114 and the RFID chip 116 may be about 8.3 mm. Additionally, the preset orientation of the sensor housing 102 within the sensor mount 104 insures that the transponder coil 114 and RFID chip 116 are within an allowable angle A so that the RFID components work properly. Notably, the transponder coil 114 may be used within the tire mounted sensor 100 as an LF receiving antenna (activated from outside of the tire) and, as such, correct orientation of the transponder coil 114 within the sensor 100 may be critical. Advantageously, the tire mounted sensor 100 not only ensures that the accelerometer is oriented properly, but that all components which require particular placement and arrangement are consistently properly placed and arranged. FIG. 4C shows a cross-section of the sensor housing 102 inserted into the sensor mount 104, illustrating the component parts described above.

Figure 5A:
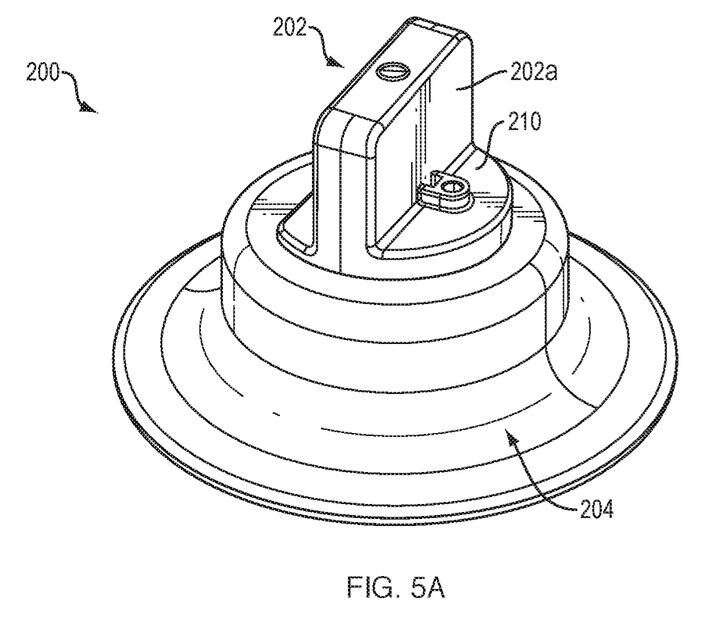
FIGS. 5A and 5B illustrate another example of the tire mounted sensor in assembled views.
Figure 5B:
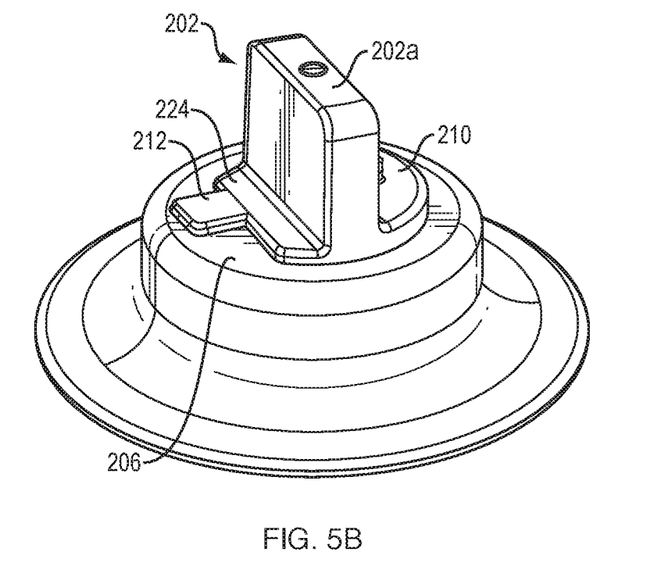

An alternative example of the tire mounted sensor 200 of this disclosure is shown in FIGS. 5A and 5B. The sensor 200 is substantially the same as the sensor 100 except as described below. In the sensor 200 of FIGS. 5A and 5B, the sensor mount 204 defines a horizontal protrusion 212 (FIG. 5B) on the orientation key 206 for accommodating the RFID chip (not explicitly shown), as further described below. The RFID chip may be glued to, slotted in or overmolded into the sensor mount 204. The sensor housing 202 includes a middle boss 210 and a lower boss 224 on opposing sides of the upper boss 202a. A rear surface 203 of the upper boss 202a facing away from the middle boss 210 is shaped to abut the orientation key 206.

Figure 5C:
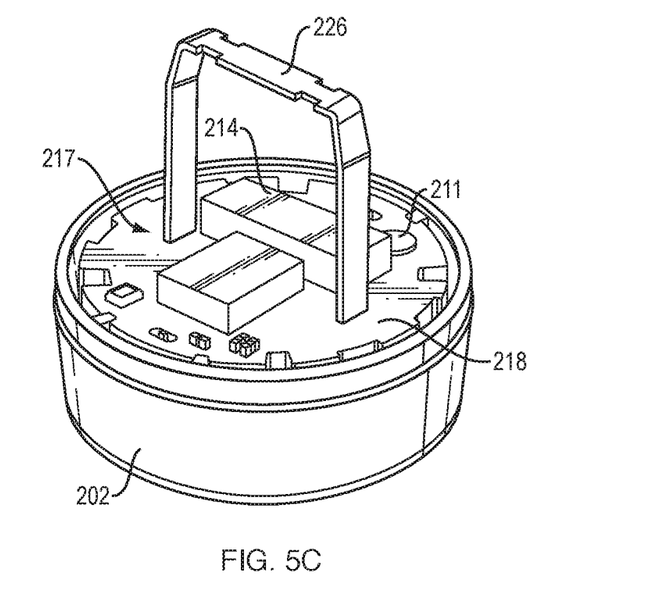
FIGS. 5C and 5D illustrate an example arrangement of the component parts of the sensor housing of FIGS. 5A and 5B.
Figure 5D:
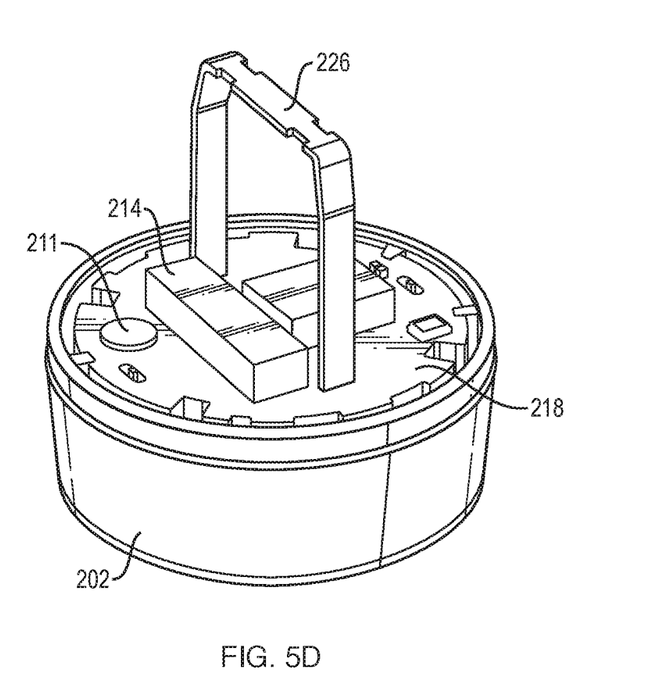
Figure 5E:
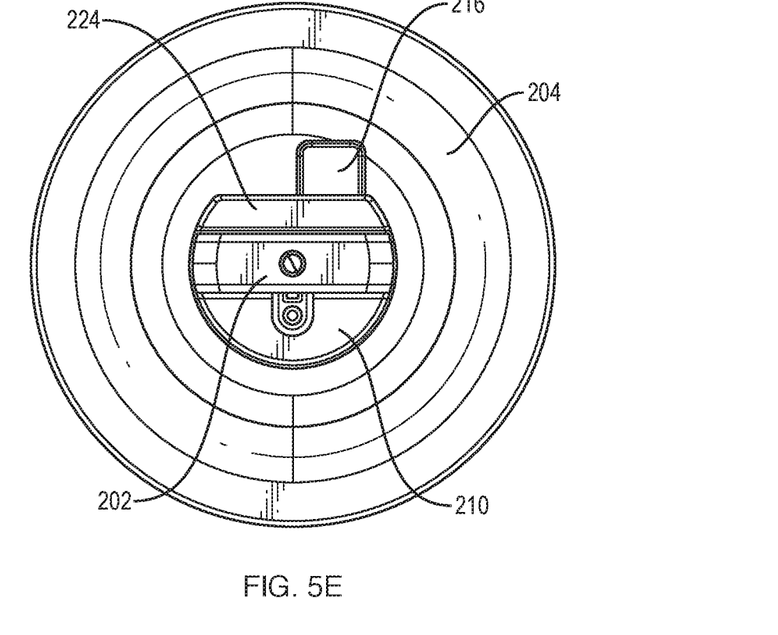
FIGS. 5E and 5F are plan and plan sectional views, respectively, of the sensor housing of FIGS. 5A and 5B inserted into the sensor mount.
Figure 5F:
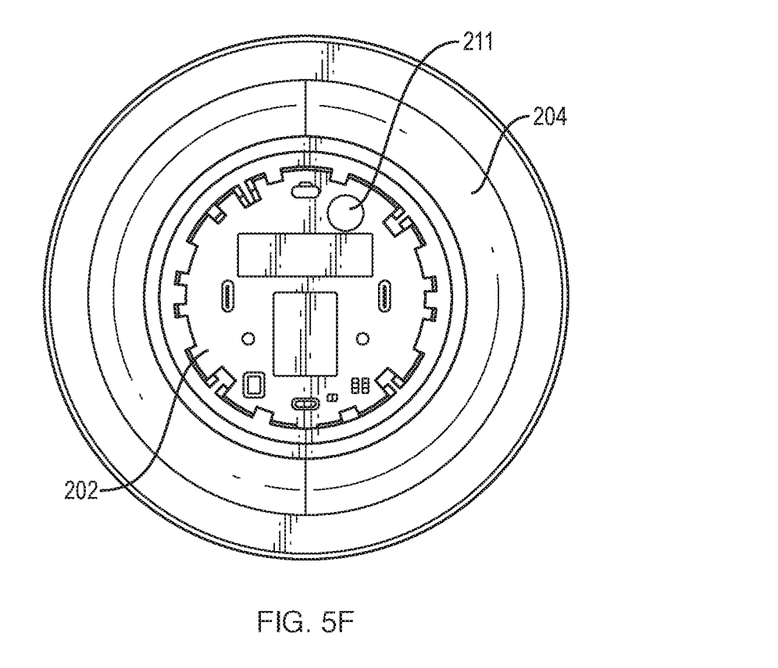
Figure 5G:
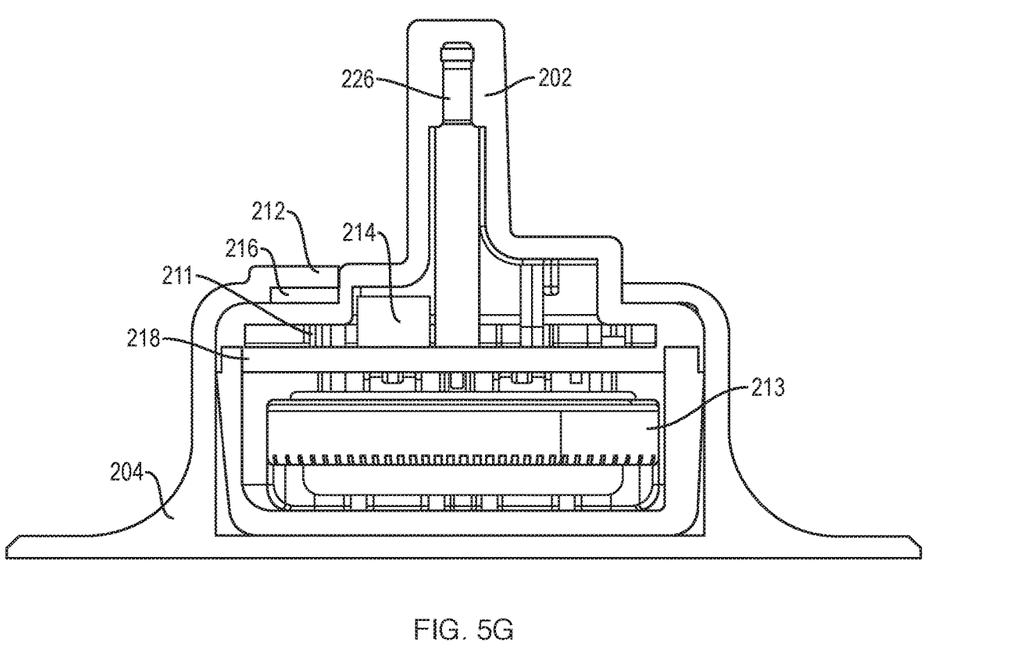
FIG. 5G is a cross-sectional view of the sensor housing of FIGS. 5A and 5B inserted into the sensor mount.

A non-limiting example of the internal components 217 of the sensor housing 202 are shown in more detail in FIGS. 5C and 5D. The internal components of the sensor housing 202 may include a RF antenna 226, a battery 213 (FIG. 5G), a transponder coil 214, one or more ASIC packages 252, and a PCB circuit board 218, as well as other related components. The PCB 218 may also include an air pressure and/or other type of sensor, and/or a printed trace or discrete chip antenna 211 for facilitating communication with the RFID chip 216 (FIG. 5E). As shown in FIGS. 5E and 5F, the RFID chip 216 and the discrete chip antenna 211 may be vertically aligned on center when the sensor housing 202 is inserted into the sensor mount 204 for improved communication. In examples, a distance between the RFID chip 216 and the discrete chip antenna 211 is selected to be 2 mm or less. FIG. 5G shows a cross-section of the sensor housing 202 inserted into the sensor mount 204 illustrating the component parts described above.

Upon initial installation to the tire, the sensor 100, 200 of this disclosure is generally remotely programmed (via low frequency, radio frequency, Bluetooth, or other means) with tire data specifically known as "Tire ID." This data contains information pertaining to the tire that the sensor 100, 200 periodically transmits to the vehicle for use in monitoring tire related features. Of particular concern is a situation where, during use, a previously programmed sensor 100, 200 is removed from the tire and remounted onto a different tire without being reprogrammed with the new tire's Tire ID. For example, the sensor 100, 200 might deliberately be removed when the tire is stationary due to a damaged tire, or accidentally removed during transit due to a collision involving the tire. This scenario results in incorrect or inaccurate data being reported to the vehicle, which may be a safety concern. Accordingly, it is desirable for the tire mounted sensor 100, 200 of this disclosure to be able to detect whether the sensor housing 102, 202 has been removed from its respective sensor mount 104, 204.

Figure 6A:
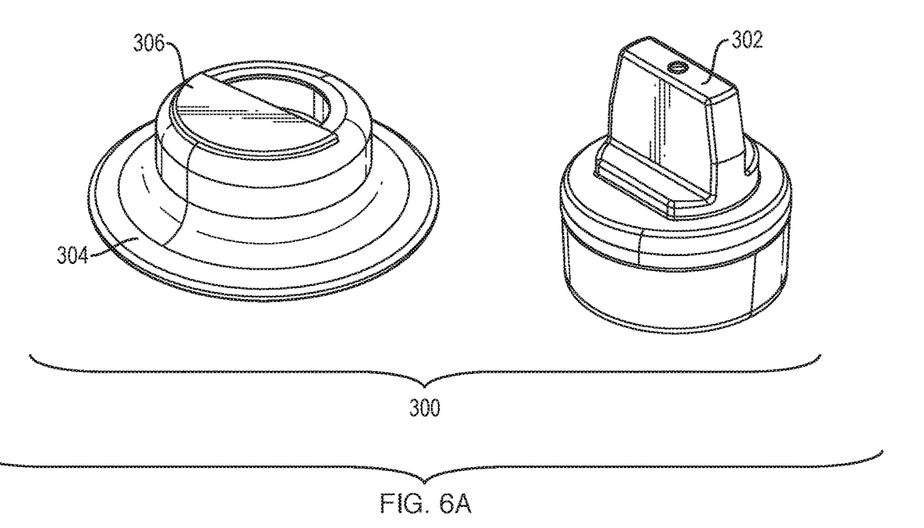
FIG. 6A illustrates another example of a tire mounted sensor of this disclosure shown in a disassembled view.

An alternative example of the tire mounted sensor 300 of this disclosure is shown in FIG. 6A. The sensor 300 is substantially the same as the sensor 100, 200 except as described below. In the sensor 300, a metallic element, such as a metal ring or spring (not explicitly shown), is embedded in the orientation key 306 of the sensor mount 304 to interact with an inductor mounted to the PCB (not explicitly shown) in the sensor housing 302. It is also contemplated that, rather than a metallic element, any detectable element could be used which emits a measurable factor, such as a magnet, another resonant circuit or a radioactive element. The inductor can be the transponder coil 114, 214 or other chip inductor. The PCB includes a circuit 350 which is shown schematically in FIG. 6B. The circuit 350 includes an ASIC package 352 connected in parallel to an inductor 354. A capacitor 356 and a resistor 358 are connected in series from the inductor 354 to ground. Within the sensor 300, the Q-sensitive element (e.g., the inductor 354) of the resonant circuit 350 is used as both a low-frequency (LF) transmitting and receiving antenna. In examples, the inductor 354 will emit a frequency (for example, 125 KHz) and the "loaded" voltage (due to the effect of the metallic element) across the inductor 354 will be measured.

Figure 6B:
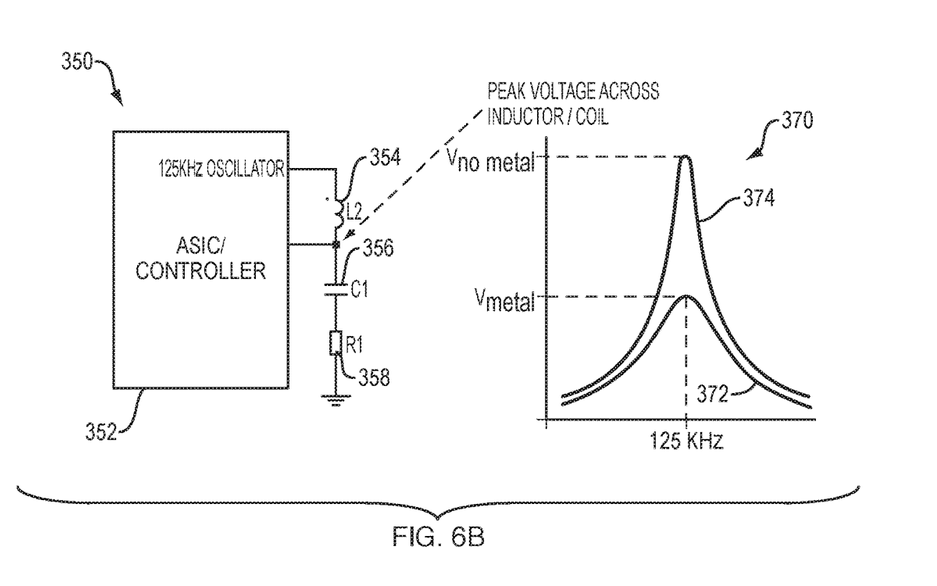
FIG. 6B illustrates a circuit and a resulting graph generated from the circuit in accordance with the subject disclosure.

Still referring to FIG. 6B, in operation, the proximity of the metallic element to the inductor 354 influences the electromagnetic field generated by the inductor 354 and hence the Q factor of the resonant circuit 350 contained within the sensor 300. Specifically, when the sensor housing 302 is mounted within the sensor mount 304, the proximity of the metallic element to the inductor 354 results in a lower Q factor, as shown in trace 372 of the graph 370. Conversely, when the sensor housing 302 is removed from the sensor mount 304, the remoteness of the metallic element from the inductor 354 results in a higher Q factor as shown in trace 374 of the graph 370. Notably, the alternating current in the inductor 354 creates an alternating magnetic field which induces small currents in the "target" metal material, known as eddy currents. The eddy currents create an opposing magnetic field which resists the field being generated by the inductor 354. The interaction of the magnetic fields is dependent on the distance between the inductor 354 and the metallic element. As the distance increases, the loading effect of the opposing magnetic field accordingly decreases.

In one non-limiting example, detection of the removal of the sensor housing 302 from the sensor mount 304 could occur as follows. First, the sensor 300 is mounted to the tire and programmed with the respective Tire ID. The tire is inflated and eventually vehicle motion is detected via the accelerometer of the sensor 300. During a stationary period of the tire, the ASIC 352 applies a signal frequency (for example, about 125 KHz) to the resonant circuit 350, and measures and records a baseline average peak voltage $V_{metal}$ detected across the inductor 354. Over time, the tire eventually becomes deflated to zero atmospheric pressure (or gauge zero). At this point, and until reinflation of the tire occurs, the sensor housing 302 determines whether the sensor housing 302 is still contained within the sensor mount 304. That is, during a stationary period of the deflated tire, the ASIC 352 again periodically (for example, about every 10 seconds) applies a frequency to the resonant circuit 350 and measures the baseline average peak voltage $V_{metal}$ detected across the inductor 354. Notably, due to the component value drift over time, it is preferable to measure the peak voltage across the inductor 354 immediately after a zero-pressure and stationary condition has been detected and to use this baseline average peak value $V_{metal}$ as a reference during the period of zero pressure until the tire has become inflated.

If the sensor housing 302 is removed from the tire, as checking of the peak voltage of the resonant circuit 350 continues, a test baseline peak voltage $V_{no\ metal}$ is acquired. If the test average peak voltage $V_{no\ metal}$ deviates from the baseline average peak voltage $V_{metal}$ recorded when the tire was just recently deflated and became stationary, and the sensor housing 302 was still contained within the sensor mount 304, it is assumed that the sensor housing 302 has been removed from the sensor mount 304. In examples, sufficient deviation may be a predetermined value that is dependent upon the mechanical design of the sensor 300 and the distance between the inductor 354 and LF coil/transponder coil. The predetermined value may be a certain voltage increase or a percentage increase, such as 10%, 25%, 50%, 75% and the like. Alternatively, the test average peak voltage $V_{no\ metal}$ may be compared to a threshold voltage $V_{threshold}$ that is an average of the baseline average peak voltage $V_{metal}$ and the test average peak voltage $V_{no\ metal}$ as shown in FIG. 6B. Such a threshold may also be selected based on empirical evidence. Once it is determined that the sensor housing 302 has been removed from the sensor mount 304, the ASIC 352 takes corrective action such as erasing the Tire ID, indicating during periodic RF transmissions that the current Tire ID is invalid, or both. At this point, the ASIC 352 may also stop applying the signal frequency until the sensor 300 has detected that the sensor housing 302 has been remounted to a reinflated tire and is in motion, which may conserve battery life.

In another non-limiting example, the ASIC 352 could apply the signal frequency immediately after tire motion has been detected to determine the baseline average peak voltage $V_{metal}$ detected across the inductor 354. Alternatively, the baseline average peak voltage $V_{metal}$ could be recorded from previous journeys or could be calibrated during manufacture of the sensor 300. During motion of the tire, the ASIC 352 periodically (for example, about every 10 minutes) applies the frequency to the resonant circuit 350 and measures the baseline average peak voltage $V_{metal}$ detected across the inductor 354. If the sensor housing 302 is removed from the tire, as checking of the peak voltage of the resonant circuit 350 continues, a test baseline peak voltage $V_{no\ metal}$ is acquired. If the test average peak voltage $V_{no\ metal}$ deviates from the baseline average peak voltage $V_{metal}$, it is assumed that the sensor housing 302 has been removed from the sensor mount 304. The ASIC 352 may then stop applying the signal frequency until the sensor 300 has detected that the sensor housing 302 has been remounted to a reinflated tire and is in motion.

It is contemplated by this disclosure that a conductive compound could be added to the sensor mount 304 such that the metallic element may not be required within the sensor mount 304 to detect the proximity of the sensor housing 302, leading to a lower-cost solution. It is further envisioned that, by interrogating an RFID tag in place of a metallic element, the sensor 300 should be able to detect the presence/non-presence of the tag. However, use of the metallic element offers a simpler and cheaper solution for sensor removal detection than the RFID tag as there will be minimal software required due to encoding and decoding RFID data. Notably, to transmit/emit a magnetic field with a suitable range (i.e., a few millimeters), a current in the order of 10's of milliamps may be required, depending on proximity of the metallic element. To reduce the impact on the lifetime and pulse loading of the battery/power source, this field is only required for 10's of cycles. Thus, for example, at 125 KHz, 0.8 milliseconds equates to 100 cycles.

It is to be understood that the details of construction and the arrangement of the components set forth in the description or illustrated in the drawings are not limiting. There are other ways of being practiced or carried out. Also, it is to be understood that the phraseology and terminology employed herein are for the purpose of description only and also should not be regarded as limiting. It is appreciated that certain features, which are, for clarity, described in the context of separate implementations, may also be provided in combination in a single implementation. Conversely, various features, which are, for brevity, described in the context of a single implementation, may also be provided separately or in any suitable sub-combination.

While various aspects have been described, it will be apparent to those of ordinary skill in the art that many more embodiments and implementations are possible and are within the scope of this disclosure.

What is claimed is:

1. A tire mounted sensor comprising:
    a mounting base comprising a top surface and a bottom surface, the bottom surface configured to be mounted to a tire of a vehicle, the top surface including an orientation key defining an asymmetrical opening in the top surface; and
    a housing for holding parameter sensing components, the housing being removeably insertable into the asymmetrical opening of the mounting base, the housing including a boss corresponding to a shape of the asymmetrical opening of the mounting base such that, when the housing is inserted into the mounting base, the housing is fixed in a preselected position.

2. The tire mounted sensor of claim 1, wherein the mounting base includes a first radio-frequency identification (RFID) component that interacts with a second RFID component in the housing.

3. The tire mounted sensor of claim 2, wherein the first RFID component of the mounting base is in a vertical protrusion defined by a sidewall of the mounting base.

4. The tire mounted sensor of claim 2, wherein the first RFID component of the mounting base is in a horizontal protrusion located on the orientation key of the mounting base.

5. The tire mounted sensor of claim 4, wherein the first and second RFID components are aligned on center when the housing is inserted into the mounting base.

6. The tire mounted sensor of claim 1, wherein orientation key includes at least one slit to allow flexing of the orientation key to facilitate insertion of the housing.

7. The tire mounted sensor of claim 1, wherein the preselected position is selected from all six axes of freedom.

8. A tire mounted sensor comprising:
    a mounting base comprising a top surface and a bottom surface, the bottom surface configured to be mounted to a tire of a vehicle, the top surface including an orientation key defining an asymmetrical opening in the top surface; and
    a sensor housing including a first RFID component having a resonant circuit having a Q factor that varies based upon proximity to a second RFID component having a detectable element within the mounting base, the sensor housing being removably insertable into the mounting base;
    wherein the resonant circuit is configured to periodically measure the Q factor to determine whether the sensor housing is inserted into the mounting base; and
    wherein the housing has a boss in a complimentary shape for selective insertion into the asymmetrical opening of the mounting base such that, when the housing is inserted into the mounting base, the housing is fixed in a preselected position relative to the mounting base.

9. The tire mounted sensor of claim 8, wherein the detectable element is selected from the group consisting of a metallic element, a magnet, a resonant circuit and a radioactive element.

10. A method for detection of removal of a sensor housing from a sensor mount of a tire mounted sensor comprising the steps of:
    with a sensor housing inserted into a sensor mount of a tire mounted sensor, applying a signal frequency to a resonant circuit in the sensor housing and measuring a baseline average peak value detected on the resonant circuit;
    periodically applying the signal frequency to the resonant circuit and measuring a test average peak value detected on the resonant circuit, the baseline average peak value and the test average peak value varying with proximity of the resonant circuit to the sensor mount;
    comparing the test average peak value and the baseline average peak value to determine whether the test average peak value deviates sufficiently from the baseline average peak value; and
    if the test average peak value deviates sufficiently from the baseline average peak value, performing a corrective action based on the sensor housing being removed from the sensor mount.

11. The method of claim 10, wherein the corrective action is selected from the group consisting of: erasing a Tire ID stored for the respective sensor housing to generate a fault; indicating, during periodic RF transmissions, that the Tire ID is invalid; and combinations thereof.

12. The method of claim 10, wherein the sensor mount includes a detectable element for enhancing a response of the resonant circuit to the signal.

13. The method of claim 12, wherein the detectable element is an RFID chip.

14. The method of claim 12, wherein the detectable element is selected from the group consisting of a metallic element, a magnet, a resonant circuit and a radioactive element.

15. The method of claim 10, wherein the resonant circuit includes an ASIC for applying the signal and an inductor with a variable Q factor for providing a test point to acquire the baseline and test average peak values.

* * * * *